United States Patent Office 3,716,602
Patented Feb. 13, 1973

3,716,602
HEAT RESISTANT ELASTOMER COMPOSITIONS
Ichiro Iwami, Tsutomu Matsunaga, Sakae Inouye, Makoto Fujimori, Noriyuki Hayashi, Norio Wada, Ken Yoneyama, and Hideaki Inaba, Tokyo, Japan, assignors to Bridgestone Tire Company Limited, Tokyo, Japan
No Drawing. Filed Dec. 12, 1969, Ser. No. 884,748
Claims priority, application Japan, Dec. 17, 1968, 43/92,046
Int. Cl. C08c 11/60; C08d 5/04; C08f 15/40
U.S. Cl. 260—889  4 Claims

ABSTRACT OF THE DISCLOSURE

Heat resistant elastomer compositions are obtained by adding to a cross-linkable elastomer composition containing at least 5% by weight of an elastomer containing an active halogen in the molecule, phenothiazine or the derivatives thereof.

---

The present invention relates to elastomer compositions having an improved thermal aging resistance and more particularly elastomer compositions having an excellent heat resistance, in which a particular effect for preventing aging is developed by synergistic function of phenothiazine and the derivatives thereof (referred to as phenothiazines hereinafter) and a halogen-containing elastomer.

Phenothiazines have been interested as a stabilizer for lubricants to be used for a high temperature and in some cases have been tested as an antioxidant for rubber but they are not particularly excellent as compared with conventional stabilizers and antioxidants and have defects in the inherent properties, therefore they heretofore have not been used practically.

The inventors have found that the phenothiazines show a synergistic effect together with active halogen-containing elastomer and develop a particular effect for preventing aging and have found novel elastomer compositions having a heat resistance.

In general, there are two tendencies in variation of physical properties of elastomers due to the thermal aging. That is, one tendency is hardening in which modulus and hardness increase and the other tendency is softening depending upon differences of molecular structure of elastomer, kind of cross-linking agent and aging condition. This is attributed to frequency of main chain breakage, rearrangement of cross-linkage structure and variation of cross-linkage density.

The effect for preventing aging through synergistic function of phenothiazine and halogen-containing elastomer against the variation of physical properties due to the thermal aging of elastomer involves prevention of main chain breakage owing to oxidation of elastomer and suppression of variation of cross-linked portions, whereby the hardening or softening of the vulcanized elastomer composition can be prevented. As the result, the breaking property based on crack occurrence and crack growth owing to hardening of vulcanized elastomer composition, which is used for heat resistance can be improved and reversely the softening abrasion and blow out owing to softening can be prevented. Furthermore, the elastomer composition of the present invention is remarkable in the effect for preventing aging in environment at an extremely high temperature of about 120–200° C., at which general antioxidants for rubber lose their function.

The heat resistant elastomer compositions of the present invention comprise adding to cross-linkable elastomer composition containing 5 to 100% by weight based on the raw rubber components, of elastomer containing active halogen in the molecule, not more than 8% by weight based on the amount of all the rubber of phenothiazine or phenothiazine derivatives.

The phenothiazine derivative to be used in the invention is shown by the following general formula

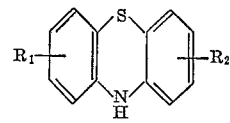

wherein $R_1$ and $R_2$ represent same or different alkyl, alkoxy or thioalkyl groups, and one of $R_1$ and $R_2$ may be hydrogen atom. The phenothiazine derivative includes 3-methylphenothiazine, 2-ethylphenothiazine, 3-ethylphenothiazine, 2-t-butylphenothiazine, 3,7-dimethylphenothiazine, 3,7-dibutylphenothiazine, 3,7-dioctylphenothiazine, 1-methoxyphenothiazine, 2-methoxyphenothiazine, 3-methoxyphenothiazine, 4-methoxyphenothiazine, 2-sec-butoxyphenothiazine, 3-octyloxyphenothiazine, 3-dodecyloxyphenothiazine, 3-hexa-decyloxyphenothiazine, 3,7-dimethoxyphenothiazine, 2,8-dimethoxyphenothiazine, 3,7-bis(octyloxy)phenothiazine, 2-methylthiophenothiazine, 3-methylthiophenothiazine, 2-isopropylthiophenothiazine, 2-sec-butylthiophenothiazine, 2-isobutylthiophenothiazine, 3-octyl-7-octyloxyphenothiazine, etc.

As the active halogen-containing elastomer, mention may be made of polychloroprene rubber, chlorosulfonated polyethylene rubber, halogenated isoprene/isobutene copolymer rubber, polyepichlorohydrin rubber, epichlorohydrin/ethylene oxide copolymer rubber, halogenated ethylene/propylene/diene terpolymer rubber, halogenated ethylene/propylene copolymer rubber, halogenated polyethylene rubber, fluorine-contained rubber, etc.

In order that the above-mentioned elastomer containing halogen in the molecule and the phenothiazine derivative develop a synergistic effect, it is not always necessary that all the raw material elastomer component in an elastomer composition is halogen-containing elastomer. A blend of a halogen-containing elastomer with an elastomer containing no halogen may develop the synergistic effect. In a blend of a halogen-containing elastomer with an elastomer containing no halogen, it is desirable that the halogen-containing elastomer is contained in an amount of at least 5% by weight based on the raw elastomer component in order that halogen-containing elastomer and phenothiazine develop a synergistic effect.

An amount of phenothiazine to be added in the present invention is not more tha 4% by weight based on the raw elastomer. The effect for preventing aging increases remarkably up to 3% by weight, as the amount of phenothiazine added increases, and the effect increases by increasing the amount in more than 3% by weight, but if the amount exceeds 4% by weight, a blooming phenomenon occurs noticeably and such amount cannot be used in practice.

An amount of phenothiazine derivatives to be added in the invention is not more than 8% by weight based on the raw elastomer. The effect for preventing aging increases as in the case of phenothiazine, as the amount of phenothiazine derivative added increases. Moreover, a blooming phenomenon does not occur. However, addition of more than 8% by weight is not suitable in practice.

The synergistic effect of the phenothiazines and the halogen-containing elastomer develops independently of the kinds of compounding agents, such as filler, softener, cross-linking agent, etc. in the elastomer composition and their compounding recipe. When a dehalogenating cross-linking agent is used as a cross-linking agent, the synergistic effect of the phenothiazines and the halogen-containing elastomer develops more remarkably. This effect for activating the synergistic effect of phenothiazines by the addition of a dehalogenating cross-linking agent is also observed in a case when the dehalogenating cross-linking agent is used together with other commonly used cross-linking agent, for example, a dehydrogenating cross-linking agent.

The cross-linkage in a halogen-containing elastomer generally proceeds due to the formation of halogen radicals or hydrogen halide resulting from dehalogenation.

As the dehalogenating cross-linking agent, which causes cross-linkage in a halogen-containing elastomer by the above mechanism, use may be made of various conventional cross-linking agents, for example, polyamines, polyamine carbamates, dimercaptans, thioureas, dioxyaromatics, derivatives of dioxy aromatics, such as di-o-tolyl-guanidine salt of dicathecol and oxides of polyvalent metals.

An amount of the dehalogenating cross-linking agent to be added can be selected optionally within the range that is commonly used in the dehalogenating cross-linkage in halogen-containing elastomer.

With respect to the mechanism of synergistic effect of the phenothiazines and halogen-containing elastomer, halogen presumably takes a part in the activation of the phenothiazines at their cation radical formation. Particularly, when dehydrogenating cross-linking agent is used, halogen ion or radical acts more strongly, and therefore the activating effect of the halogen-containing cross-linking agent against the phenothiazines develops more remarkably, but the mechanism is not clear at present.

The following examples are given in illustration of this invention and are not intended as limitations thereof. Examples 1, 2, 3, 4 and 7 show the effect of phenothiazines added to a rubber composition, in which all the raw elastomer component is halogen-containing elastomer. Examples 5 and 6 show the effect of phenothiazines added to an elastomer composition, in which the raw elastomer component is a mixture of a copolymer containing active halogen and that containing no active halogen. The numerical value in the compounding recipe means "part by weight."

EXAMPLE 1

This example shows the effect of phenothiazine added to an elastomer composition wherein a chlorinated isoprene/isobutene copolymer (hereinafter abridged as chlorinated IIR) was used as a halogen-containing elastomer and a thiuram or sulfur, which is commonly used as a dehydrogenating cross-linking agent, was used.

(1) Compounding recipe

| Sample | 1-1 | Control, 1-1' | 1-2 | Control, 1-2' |
|---|---|---|---|---|
| Chlorinated IIR [1] | 100 | 100 | 100 | 100 |
| Carbon black (HAF grade) | 60 | 60 | 60 | 60 |
| Stearic acid | 1 | 1 | 1 | 1 |
| Spindle oil | 8 | 8 | 8 | 8 |
| Zinc white | 8 | 8 | 5 | 5 |
| Tetramethylthiuram disulfide | 3 | 3 | 1 | 1 |
| 2-mercapto-benzothiazole | | | 1 | 1 |
| Sulfur | | | 2 | 2 |
| Phenothiazine | 2.5 | | 2.5 | |

[1] HT1066, made by Esso Co.

(2) Conditions for preparing test samples.—
Vulcanization condition: 140° C. × 60 minutes.
Aging condition: JIS No. 1 dumbell specimen is left to stand for 48 hours in air at 150° C.

(3) Result

| Composition | 1-1 | Control, 1-1' | 1-2 | Control, 1-2' |
|---|---|---|---|---|
| Physical properties: | | | | |
| Before aging: | | | | |
| Hardness (°) (JIS [1]) | 53 | 54 | 56 | 58 |
| Elongation at break (percent) | 690 | 670 | 680 | 660 |
| Tensile strength (kg./cm.²) | 175 | 170 | 178 | 181 |
| 300% modulus (kg./cm.²) | 64 | 67 | 72 | 79 |
| After aging: | | | | |
| Hardness (°) (JIS [1]) | 58 | 52 | 60 | 57 |
| Elongation at break (percent) | 600 | 520 | 590 | 520 |
| Tensile strength (kg./cm.²) | 168 | 85 | 155 | 80 |
| 300% modulus (kg./cm.²) | 69 | 54 | 77 | 57 |

[1] Abbreviation of "Japanese Industrial Standard." Hereinafter this abbreviation will be used.

As seen from the result when phenothiazine is not added, if the resulting composition is aged in air at 150° C., the effective density of networks lowers and the elastomer composition softens. On the other hand, when phenothiazine is added, the networks are stabilized and the softening is prevented. Moreover, the elastomer composition after aging is somewhat higher than that before aging in 300% modulus. The tensile strength is maintained favourably.

EXAMPLE 2

This example shows the effect of phenothiazine added to an elastomer composition, wherein a dehydrogenating cross-linking agent was used for a halogen-containing elastomer.

(1) Compounding recipe

| Composition | 2-1 | Control, 2-1' | 2-2 | Control, 2-2' | 2-3 | Control' 2-3, |
|---|---|---|---|---|---|---|
| Chlorinated IIR [1] | 100 | 100 | | | | |
| Polychloroprene rubber [2] | | | 100 | 100 | | |
| Epichlorohydrin rubber [3] | | | | | 100 | 100 |
| Carbon black (FEF grade) | 50 | 50 | 50 | 50 | 50 | 50 |
| Stearic acid | 1 | 1 | 1 | 1 | | |
| Spindle oil | 8 | 8 | 8 | 8 | | |
| Zinc white | 5 | 5 | 5 | 5 | 10 | 10 |
| Magnesium oxide | 2.5 | 2.5 | 2.5 | 2.5 | | |
| Hexamethylenediamine carbamate | 2.5 | 2.5 | | | | |
| 2-mercaptoimidazoline-ethylenethiourea | | | 0.7 | 0.7 | 1.0 | 1.0 |
| Pentaerythritol | | | | | 5.0 | 5.0 |
| Phenothiazine | 2.0 | | 3.0 | | 3.0 | |
| Tetrathiuramthiourea | | | 0.3 | 0.3 | | |

[1] HT1066, made by Esso Co.
[2] Neoprene W, made by Du Pont Co.
[3] Made by Hercules Co.

(2) Conditions for preparing test samples

|  | 2-1 | 2-1' | 2-2 | 2-2' | 2-3 | 2-3' |
|---|---|---|---|---|---|---|
| Vulcanization condition: | | | | | | |
| 140° C.×(mins.) | 60 | 60 | 60 | 60 | | |
| 145° C.×(mins.) | | | | | 45 | 45 |
| Aging condition | JIS No. 1 dumbell specimen is left to stand for 48 hours in air at 150° C. | | | | | |

(3) Result

| Composition | 2-1 | Control, 2-1' | 2-2 | Control, 2-2' | 2-3 | Control, 2-3' |
|---|---|---|---|---|---|---|
| Physical properties: | | | | | | |
| Before aging: | | | | | | |
| Hardness degrees, (JIS) | 56 | 57 | 70 | 73 | 80 | 82 |
| Elongation at break (percent) | 460 | 470 | 280 | 235 | 310 | 290 |
| Tensile strength (kg./cm.²) | 175 | 169 | 292 | 266 | 172 | 165 |
| 300% modulus (kg./cm.²) | 117 | 112 | | | | |
| After aging: | | | | | | |
| Hardness degrees, (JIS) | 63 | 70 | 80 | 90 | 84 | 91 |
| Elongation at break (percent) | 420 | 330 | 230 | 60 | 220 | 90 |
| Tensile strength (kg./cm.²) | 149 | 128 | 265 | 109 | 189 | 170 |
| 300% modulus (kg./cm.²) | 119 | 125 | | | | |
| Cut growth index at 100° C | 1,230 | 100 | 346 | 100 | | |

As seen from the above table, when phenothiazine is added, the decrease of elongation of the elastomer composition by aging is considerably suppressed, and further the changes of hardness and modulus of elasticity by aging is very small. As the result, the cut growth resistance of the elastomer composition is remarkably improved.

That is, when the elastomer composition cross-linked by a diamine is aged, it forms secondary networks more easily than the elastomer composition cross-linked by a thiuram or sulfur in Example 1, and apt to harden. However, when elastomer compositions added with phenothiazine are aged, the secondary cross-linking due to the aging can be prevented. Thus, phenothiazine can stabilize the network structure in both of the elastomer compositions added with diamine, or thiuram or sulfur.

EXAMPLE 3

This example shows the effect of phenothiazine or phenothiazine derivative added to elastomer compositions, wherein polychloroprene rubber was used as a halogen-containing elastomer.

(1) Compounding recipe

| Composition | 3-1 | Control 3-1' | Control 3-1'' | 3-2 | Control 3-2' | Control 3-2'' |
|---|---|---|---|---|---|---|
| Polychloroprene rubber [1] | 100 | 100 | 100 | 100 | 100 | 100 |
| Carbon black (GPF grade) | 50 | 50 | 50 | 50 | 50 | 50 |
| TCP [2] | 10 | 10 | 10 | 10 | 10 | 10 |
| Magnesium oxide | 4 | 4 | 4 | 4 | 4 | 4 |
| 2-mercaptoimidazoline | 0.35 | 0.35 | 0.35 | | | |
| Diphenylguanidine | | | | 1 | 1 | 1 |
| Sulfur | | | | 1 | 1 | 1 |
| Zinc white | 5 | 5 | 5 | 5 | 5 | 5 |
| Dioctylphenothiazine | 1 | | | 1 | | |
| Phenothiazine | | 1 | | | 1 | |

[1] Neoprene W, made by Du Pont Co.
[2] Tricresyl phosphate.

(2) Conditions for preparing test samples

Vulcanization conditions: 155° C.×40 minutes.
Aging condition: JIS No. 3 dumbell specimen is left to stand for 24 hours in air at 150° C.

(3) Result

| Composition | 3-1 | Control 3-1' | 3-1'' | 3-2 | Control 3-2' | 3-2'' |
|---|---|---|---|---|---|---|
| Physical properties: | | | | | | |
| Before aging: | | | | | | |
| Hardness degrees, (JIS) | 58 | 56 | 60 | 60 | 59 | 52 |
| Elongation at break (percent) | 370 | 410 | 340 | 365 | 365 | 355 |
| Tensile strength (kg./cm.²) | 200 | 210 | 205 | 200 | 185 | 210 |
| 300% modulus (kg./cm.²) | 180 | 166 | 195 | 181 | 175 | 195 |
| After aging: | | | | | | |
| Hardness degrees, (JIS) | 68 | 67 | 72 | 74 | 74 | 78 |
| Elongation at break (percent) | 160 | 195 | 65 | 100 | 115 | 60 |
| Tensile strength (kg./cm.²) | 110 | 140 | 70 | 86 | 100 | 75 |
| 300% modulus (kg./cm.²) | | | | | | |

As seen from the above table, when phenothiazine or its derivative is not added, if the resulting elastomer composition is aged in air at 150° C., the elastomer composition remarkably hardens. On the other hand when phenothiazine or its derivative is added, the hardening is prevented, and moreover the tensile strength is maintained favorably.

The molecular weight of dioctylphenothiazine is about 2 times that of phenothiazine, and when dioctylphenothiazine or phenothiazine is added in the same amount, substantially the same effect can be attained. This fact shows that dioctylphenothiazine has an effect for preventing aging remarkably higher than phenothiazine.

EXAMPLE 4

This example shows the effect of phenothiazine or its derivative added to various halogen-containing elastomer compositions.

(1) Compounding recipe

| Composition | 4-1 | Control 4-1' | 4-1'' | 4-2 | Control 4-2' | 4-2'' | 4-3 | Control 4-3' | 4-3'' |
|---|---|---|---|---|---|---|---|---|---|
| Polychloroprene rubber [1] | 100 | 100 | 100 | | | | | | |
| Chlorosulfonated polyethylene rubber [2] | | | | 100 | 100 | 100 | | | |
| Chlorinated IIR [3] | | | | | | | 100 | 100 | 100 |
| Carbon black (GPF grade) | 50 | 50 | 50 | 50 | 50 | 50 | 50 | 50 | 50 |
| TCP | 10 | 10 | 10 | 10 | 10 | 10 | 10 | 10 | 10 |
| Magnesium oxide | 4 | 4 | 4 | 10 | 10 | 10 | 1 | 1 | 1 |
| 2-mercaptoimidazoline | 0.35 | 0.35 | 0.35 | | | | 1 | 1 | 1 |
| Bis-tetra-sulfide | | | | 2 | 2 | 2 | | | |
| Zinc white | 5 | 5 | 5 | | | | 5 | 5 | 5 |
| Dioctylphenothiazine | 2-1 | | | 2.1 | | | 2.1 | | |
| Phenothiazine | | 1 | | | 1 | | | 1 | |

[1] Neoprene GRT, made by Du Pont Co.
[2] Hypalon 29, made by Du Pont Co.
[3] HT1066, made by Esso Co.

(2) Conditions for preparing test samples

Vulcanization condition: 155° C. × 40 minutes
Aging condition:
  Polychloroprene rubber and chlorosulfonated polyethylene rubber composition are left to stand for 24 hours in air at 130° C.
Chlorinated IIR composition is left to stand for 24 hours in air at 150° C.

(3) Results

| Composition | 4-1 | Control 4-1' | Control 4-1'' | 4-2 | Control 4-2' | Control 4-2'' | 4-3 | Control 4-3' | Control 4-3'' |
|---|---|---|---|---|---|---|---|---|---|
| Physical properties: | | | | | | | | | |
| Before aging: | | | | | | | | | |
| Hardness (°) (JIS) | 61 | 62 | 63 | 66 | 66 | 66 | 44 | 45 | 48 |
| Elongation at break (percent) | 365 | 370 | 300 | 300 | 295 | 285 | 480 | 430 | 385 |
| Tensile strength (kg./cm.$^2$) | 190 | 200 | 190 | 220 | 220 | 220 | 125 | 120 | 115 |
| 300% modulus (kg./cm.$^2$) | 182 | 186 | | | | | 86 | 94 | 97 |
| After aging: | | | | | | | | | |
| Hardness (°) (JIS) | 65 | 65 | 66 | 69 | 68 | 69 | 47 | 49 | 48 |
| Elongation at break (percent) | 265 | 280 | 235 | 285 | 260 | 245 | 520 | 450 | 440 |
| Tensile strength (kg./cm.$^2$) | 175 | 160 | 170 | 210 | 210 | 230 | 82 | 86 | 86 |
| 300% modulus (kg./cm.$^2$) | | | | | | | 54 | 65 | 69 |
| Cut growth index at 100° C | 185 | 250 | 100 | 145 | 130 | 100 | 250 | 150 | 100 |

As seen from the above table, the cut growth resistance of all the polychloroprene rubber, chlorosulfonated polyethylene rubber and chlorinated IIR compositions is improved by the addition of phenothiazine or its derivative.

EXAMPLE 5

This example shows the effect of phenothiazine added to ethylene/propylene terpolymer rubber (hereinafter abridged as EPT rubber) composition.

In this example, EPT rubber was blended with chlorinated IIR, because EPT rubber does not contain active halogen. Further, the effect of a dehalogenating agent to the blended chlorinated IIR is shown.

For comparison, samples, wherein chlorinated IIR is not blended, are shown.

(1) Compounding recipe

| Composition | 5-1 | 5-2 | Control 5-1' | Control 5-2' | Control 5-3' |
|---|---|---|---|---|---|
| EPT [1] | 90 | 90 | 90 | 100 | 100 |
| Chlorinated IIR [2] | 10 | 10 | 10 | | |
| Carbon black (HAF grade) | 50 | 50 | 50 | 50 | 50 |
| Stearic acid | 1 | 1 | 1 | 1 | 1 |
| Zinc white | 5 | 5 | 5 | 5 | 5 |
| Alkylphenolformaldehyde resin [3] | 5 | 5 | 5 | 5 | 5 |
| Tetramethylthiuram disulfide | 3.5 | 3.5 | 3.5 | 3.5 | 3.5 |
| Phenothiazine | 2.0 | 2.0 | | | 2.0 |
| Hexamethylenediamine carbamate | | 0.5 | | | |

[1] EPT301, made by Uniroyal Co.
[2] HT1066, made by Esso Co.
[3] Sumilite PR-19900, made by Sumitomo Bakelite Co.

(2) Conditions for preparing test samples.—

Vulcanization condition: 140° C. × 60 minutes, press vulcanization
Aging condition: 150° C. × 48 hours, left to stand in air (3) Result

| Composition | 5-1 | 5-2 | Control 5-1' | Control 5-2' | Control 5-3' |
|---|---|---|---|---|---|
| Physical properties: | | | | | |
| Before aging: | | | | | |
| Hardness (degrees) (JIS) | 60 | 59 | 60 | 64 | 62 |
| Elongation at break (percent) | 610 | 600 | 595 | 630 | 615 |
| Tensile strength (kg./cm.$^2$) | 166 | 169 | 164 | 185 | 180 |
| 300% modulus (kg./cm.$^2$) | 64 | 69 | 60 | 70 | 70 |
| After aging: | | | | | |
| Hardness (degrees) (JIS) | 67 | 67 | 73 | 75 | 74 |
| Elongation at break (percent) | 450 | 495 | 340 | 310 | 320 |
| Tensile strength (kg./cm.$^2$) | 180 | 180 | 175 | 200 | 197 |
| 300% modulus (kg./cm.$^2$) | 120 | 98 | 170 | 190 | 187 |

As seen from the above table, EPT rubber composition shows a typical hardening-type aging, wherein the hardness and modulus considerably increased, and the elongation lowers by thermal aging. Even if an EPT rubber composition is blended with a small amount of chlorinated IIR, these properties remain unchanged. However, when phenothiazine is added to EPT rubber composition blended with chlorinated IIR, the hardening by heat of the rubber composition is considerably suppressed. In the sample wherein diamine carbamate having dichlorinating ability of the blended chlorinated IIR is added and the resulting mixture is vulcanized, the effect of phenothiazine is more improved.

As seen from the comparison, in the EPT rubber composition, which is not blended with chlorinated IIR, addition of phenothiazine is not effective.

EXAMPLE 6

This example shows the effect of various phenothiazine derivatives added to EPT rubber composition. The EPT rubber was blended with chlorinated IIR, because the EPT rubber does not contain active halogen.

(1) Compounding recipe

| | |
|---|---|
| EPT301 [1] | 90 |
| Chlorinated IIR [2] | 10 |
| Carbon black (HAF grade) | 50 |
| Stearic acid | 1 |
| Zinc white | 5 |
| Alkylphenol-formaldehyde resin [3] | 5 |
| Tetramethylthiuram disulfide | 3.5 |
| Hexamethylenediamine carbamate | 0.5 |
| Phenothiazine derivative | Variable |

[1] EPT301, made by Uniroyal Co.
[2] HT1066, made by Esso Co.
[3] Sumilite PR-19900, made by Sumitomo Bakelite Co.

(2) Conditions for preparing test samples

Vulcanization condition: 140° C. × 60 minutes, press vulcanization
Aging condition: 150° C. × 24 hours, left to stand in hot air (3) Result

| Composition | 6-1 | 6-2 | 6-3 | 6-4 | 6-5 | 6-6 | 6-7 | 6-8 | 6-9 | Control | | |
|---|---|---|---|---|---|---|---|---|---|---|---|---|
| | | | | | | | | | | 6' | 6'' | 6''' |
| Phenothiazines: | | | | | | | | | | | | |
| 3-t-butylphenothiazine | 1.5 | 3.0 | 4.5 | | | | | | | | | |
| 3,7-di-t-butylphenothiazine | | | | 1.5 | 3.0 | 4.5 | | | | | | |
| 3,7-di-octylphenothiazine | | | | | | | 1.5 | 3.0 | 4.5 | | | |
| Phenothiazine | | | | | | | | | | 1.0 | 1.5 | |
| Physical properties: | | | | | | | | | | | | |
| Before aging: | | | | | | | | | | | | |
| Hardness (degrees) (JIS) | 60 | 60 | 58 | 59 | 58 | 59 | 58 | 58 | 58 | 60 | 60 | 60 |
| Elongation at break (percent) | 535 | 540 | 585 | 555 | 565 | 555 | 540 | 550 | 560 | 465 | 495 | 510 |
| Tensile strength (kg./cm.$^2$) | 100 | 95 | 105 | 95 | 105 | 110 | 95 | 100 | 105 | 95 | 100 | 99 |
| 300% modulus (kg./cm.$^2$) | 61 | 56 | 56 | 55 | 61 | 59 | 55 | 59 | 55 | 66 | 68 | 56 |
| Blooming | No | No | No | No | No | (¹) | No | No | No | Yes | (²) | No |
| After aging: | | | | | | | | | | | | |
| Hardness (degree) (JIS) | 67 | 66 | 64 | 67 | 65 | 64 | 66 | 62 | 60 | 68 | 69 | 68 |
| Elongation at break (percent) | 360 | 475 | 480 | 400 | 465 | 510 | 385 | 420 | 470 | 380 | 360 | 320 |
| Tensile strength (kg./cm.$^2$) | 105 | 90 | 75 | 105 | 90 | 75 | 105 | 95 | 80 | 105 | 100 | 110 |
| 300% modulus (kg./cm.$^2$) | 97 | 64 | 53 | 92 | 68 | 53 | 94 | 79 | 59 | 100 | 95 | |
| Cut growth index at 100° C | 360 | 515 | 420 | 360 | 515 | 375 | 290 | 455 | 420 | 145 | 285 | 100 |

¹ A few.  ² Remarkable.

As seen from the above table, elastomer composition, wherein EPT rubber is blended with a small amount of chlorinated IIR, hardens by thermal aging, and causes lowering of cut growth resistance.

It can be seen that as the amount of each phenothiazine derivative added is increased, the hardening of the elastomer composition by heat is more suppressed. However, when phenothiazine is added in an amount of 1.0% by weight, a blooming phenomenon occurs, and in addition of 1.5% by weight such a phenomenon becomes remarkable, so that the effect of phenothiazine cannot be maintained for a long period of time.

On the other hand, even when alkyl-substituted phenothiazine is added in an amount up to 4.5% by weight, a blooming phenomenon does not occur, and further the hardening of elastomer composition is considerably suppressed.

EXAMPLE 7

This example shows the effect of phenothiazine derivative added to halogen-containing elastomer.

(1) Compounding recipe

| Composition | 7-1 | 7-2 | 7-3 |
|---|---|---|---|
| Chlorinated IRR ¹ | 100 | 100 | 100 |
| Carbon black (GPF grade) | 50 | 50 | 50 |
| TCP | 10 | 10 | 10 |
| Magnesium oxide | 1 | 1 | 1 |
| 2-mercaptoimidazoline | 1 | 1 | 1 |
| Zinc white | 5 | 5 | 5 |
| Dioctylphenothiazine | 3 | | |
| Tetrachlorophenothiazine | | | 3 |

¹ HT1066, made by Esso Co.

(2) Conditions for preparing test samples

Vulcanization condition: 155° C x 40 minutes
Aging condition: left to stand for 24 hours in air at 150° C.

(3) Result

| Composition | 7-1 | 7-2 | 7-3 |
|---|---|---|---|
| Physical properties: | | | |
| Before aging: | | | |
| Hardness (degrees) (JIS) | 48 | 54 | 50 |
| Elongation at break (percent) | 525 | 360 | 395 |
| Tensile strength (kg./cm.$^2$) | 125 | 110 | 120 |
| 300% modulus (kg./cm.$^2$) | 72 | 94 | 100 |
| After aging: | | | |
| Hardness (degrees) (JIS) | 48 | 54 | 51 |
| Elongation at break (percent) | 525 | 405 | 375 |
| Tensile strength (kg./cm.$^2$) | 75 | 85 | 85 |
| 300% modulus (kg./cm.$^2$) | 46 | 69 | 71 |
| Cut growth index at 100° C | 300 | 140 | 100 |

As seen from the above table, the effect of phenothiazine derivative added to halogen containing elastomer is remarkable.

For comparison, the effect of antioxidants other than phenothiazines, and the effect of phenothiazines added to elastomer composition, wherein the raw elastomer contains no active halogen, will be described in the following Comparative Examples 1 and 2.

Comparative Example 1

This example shows the effect of phenothiazine and that of commonly used typical antioxidants other than phenothiazines added to the chlorinated butyl rubber composition used in Example 2. As a phenol series antioxidant, 2,2'-methylene-bis(4 - methyl-t - butyl - phenol) (hereinafter abridged as antioxidant A) is used. As an amine series antioxidant, 2,2,4-trimethyl - 1,2 - dihydroquinoline polymer (hereinafter abridged as antioxidant B) and phenyl-β-naphthylamine (hereinafter abridged as antioxidant C) were used. The amount of antioxidant to be added was 2% by weight based on raw elastomer in the elastomer composition.

Vulcanization condition and aging condition were same with Example 1.

The obtained result is shown in the following table.

As seen from the table, the effect of these antioxidants is extremely inferior to that of phenothiazine, and particularly the effect of amine series antioxidant is not observed at all.

| Composition | 2-4 | Control | | |
|---|---|---|---|---|
| | | 2-1 ¹ | 8-1 ¹ | 8-2 ¹ 8-3 ³ |
| Physical properties: | | | | |
| Before aging: | | | | |
| Hardness (degrees) (JIS) | 56 | 57 | 55 | 59 60 |
| Elongation at break (percent) | 460 | 470 | 460 | 450 470 |
| Tensile strength (kg./cm.$^2$) | 175 | 169 | 172 | 169 170 |
| 300% modulus (kg./cm.$^2$) | 117 | 112 | 120 | 117 115 |
| After aging: | | | | |
| Hardness (degrees) (JIS) | 63 | 70 | 69 | 76 72 |
| Elongation at break (percent) | 420 | 330 | 330 | 230 230 |
| Tensile strength (kg./cm.$^2$) | 149 | 128 | 130 | 129 111 |
| 300% modulus (kg./cm.$^2$) | 119 | 125 | 142 | |
| Cut growth index at 100° C | 1,230 | 100 | 200 | 100 125 |

¹ Added with antioxidant A.
² Added with antioxidant B.
³ Added with antioxidant C.

Comparative Example 2

This example shows the effect of phenothiazine added to styrene/butadiene rubber (hereinafter abridged as SBR) containing no halogen in the molecule.

(1) Compounding recipe

| Composition | Control, 9-1 | Control, 9-2 |
|---|---|---|
| SBR #1500 | 100 | 100 |
| Carbon black (HAF grade) | 55 | 55 |
| Stearic acid | 1 | 1 |
| Spindle oil | 5 | 5 |
| Zinc white | 5 | 5 |
| Dibenzothiazyl disulfide | 1.3 | 1.3 |
| Sulfur | 2.0 | 2.0 |
| Phenothiazine | | 2 |

(2) Conditions for preparing test samples

Vulcanization condition: 140° C.×45 minutes
Aging condition: JIS No. 1 dumbell specimen is left to stand for 48 hours in air at 150° C.

(3) Result

| Composition | Control, 9-1 | Control, 9-2 |
|---|---|---|
| Before aging: | | |
| Hardness (degrees) (JIS) | 54 | 56 |
| Elongation at break (percent) | 605 | 585 |
| Tensile strength (kg./cm.²) | 261 | 258 |
| 300% modulus (kg./cm.²) | 94 | 104 |
| After aging: | | |
| Hardness (degrees) (JIS) | 67 | 68 |
| Elongation at break (percent) | 315 | 280 |
| Tensile strength (kg./cm.²) | 215 | 194 |
| 300% modulus (kg./cm.²) | | |

As seen from the above table, the effect of phenothiazine added to halogen-containing elastomer is not observed in elastomer containing no halogen.

What is claimed is:

1. A vulcanizable composition comprising
   (a) a rubber cross-linking agent selected from the group consisting of a mixture of at least one of sulfur and tetramethylthiuram disulfide and at least one of hexamethylene-diamine carbamate and magnesium oxide,
   (b) a rubber consisting of not more than 95% by weight of ethylene-propylene-diene terpolymer and 5 to 100% by weight of chlorinated isoprene-isobutene copolymer,
   (c) not more than 8% by weight based upon the rubber of phenothiazine or a phenothiazine derivative having the general formula

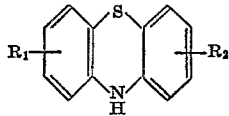

wherein at least one of R₁ and R₂ is selected from the group consisting of alkyl, alkoxy, thioalkyl, halogenated alkyl, halogenated alkoxy, and halogenated thioalkyl group having 1 to 18 carbon atoms.

2. The elastomer composition of claim 1, wherein said phenothiazine derivative is alkylated phenothiazine.

3. The elastomer composition of claim 2, wherein said alkylated phenothiazine is selected from the group consisting of dioctylphenothiazine, mono-t-butylphenothiazine and di-t-butylphenothiazine.

4. A vulcanizate obtained by heat curing the vulcanizable composition of claim 1.

References Cited

UNITED STATES PATENTS

| 1,809,798 | 6/1931 | Clifford | 260—800 |
| 1,950,442 | 3/1934 | Williams et al. | 260—92.3 |
| 1,967,863 | 7/1934 | Collins et al. | 260—92.3 |
| 2,630,398 | 3/1953 | Brooks et al. | 260—79.3 |
| 2,732,354 | 1/1956 | Morrissey et al. | 260—5 |
| 2,815,336 | 12/1957 | Freytag et al. | 260—92.3 |
| 2,962,475 | 11/1960 | Malz et al. | 260—45.8 |
| 2,983,707 | 5/1961 | Baldwin et al. | 260—45.9 |
| 3,297,660 | 1/1967 | Becker | 260—79.5 |
| 3,364,170 | 1/1968 | Savides | 260—45.8 |
| 3,028,346 | 4/1962 | Lemiszka et al. | 260—5 |
| 3,163,626 | 12/1964 | Minckler, Jr., et al. | 260—85.3 |
| 3,343,582 | 9/1967 | Himes et al. | 152—330 |
| 3,454,462 | 7/1969 | Hawley | 161—243 |
| 3,534,123 | 10/1970 | Bostock et al. | 260—888 |
| 3,580,867 | 5/1971 | Spenadel | 260—2.5 |
| 3,630,974 | 12/1971 | Ladocsi et al. | 260—5 |

OTHER REFERENCES

Hofmann, "Vulcanization and Vulcanizing Agents," 1967, pp. 13–15, section 1.1.2.11.1.

DONALD E. CZAJA, Primary Examiner

R. A. WHITE, Assistant Examiner

U.S. Cl. X.R.

260—45.8 SN, 79.5 A, 85.3 C